INVENTOR.
KEITH A. HARRIGER
BY
Arthur L. Collins
Attorney

Dec. 7, 1965 K. A. HARRIGER 3,222,616

STABLE BLOCKING OSCILLATOR FOR GENERATION OF ASYMMETRIC BIDIRECTIONAL CURRENT PULSES

Filed Sept. 12, 1962 2 Sheets-Sheet 2

INVENTOR.
KEITH A. HARRIGER

Arthur W. Cadline [signature]
ATTORNEY

United States Patent Office
3,222,616
Patented Dec. 7, 1965

3,222,616

STABLE BLOCKING OSCILLATOR FOR GENERATION OF ASYMMETRIC BIDIRECTIONAL CURRENT PULSES

Keith A. Harriger, Glen Burnie, Md., assignor to the United States of America as represented by the Secretary of the Navy Filed Sept. 12, 1962, Ser. No. 224,592
3 Claims. (Cl. 331—113)

The present invention relates to novel and improved apparatus for the generation of alternating curent signals. More particularly, it relates to novel and improved apparatus for generating an asymmetric alternating current pulse in which the parameters of width, amplitude and frequency are easily controlled.

In various electrical and electronic applications, it often becomes necessary and desirable to generate and use an asymmetric alternating current pulse or wave. Thus, for example, in the excitation of a multiaperture magnetic core generally known as a transfluxor, a large amplitude pulse of one polarity and a relatively small amplitude pulse of opposite polarity is generally necessary to provide proper operation at high efficiency. Although various methods and apparatus have been provided in the past to generate asymmetric waves, considerable difficulty has been experienced heretofore in providing apparatus of this kind which is relatively simple in design and yet sufficiently reliable, efficient and dependable in use.

It is therefore a principal object of the present invention to provide a novel and improved asymmetric wave generator in which the various parameters of the output signal may be readily controlled.

It is a further object of the present invention to provide a novel and improved asymmetric wave generator which operates at high efficiency and which can be used in the limited space often available on a transfluxor or other electrical equipment.

Other objects and many of the attendant advantages of this invention will be readily appreciated as the same becomes better understood by reference to the following detailed description when considered in connection with the accompanying drawings wherein.

Figure 1:
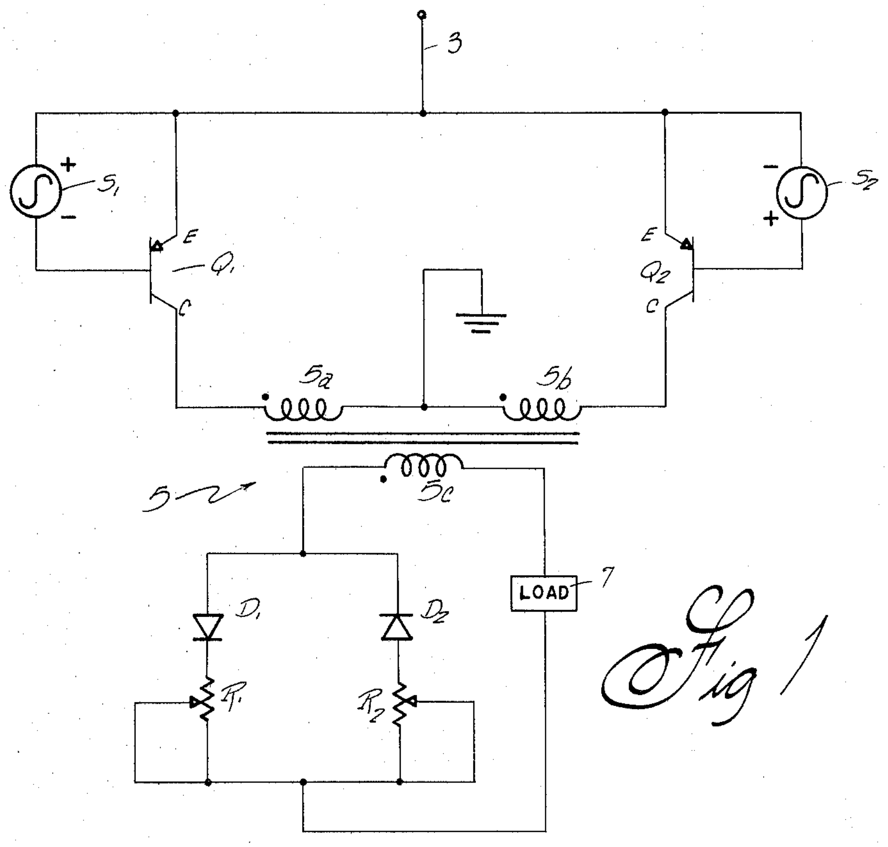
FIG. 1 is a diagrammatic view of a preferred embodiment of the present invention.

One preferred embodiment of the present invention is illustrated in FIG. 1 of the drawing. As shown therein, the emitter-collector circuit of transistor $Q_1$ extends from the direct current power supply line 3 through the transistor and through the primary winding $5_a$ of transformer 5 to ground. The base of transistor $Q_1$ is coupled to its emitter through the alternating current source $S_1$. The emitter-collector circuit of transistor $Q_2$ extends from the power supply line 3 through transistor $Q_2$ and through the other primary winding $5_b$ of transformer 5 to ground. The base of transistor $Q_2$ is coupled to its emitter through the alternating curent source $S_2$, which operates at the same frequency but 180 degrees out of phase with source $S_1$. The secondary winding $5_c$ of transformer 5 is coupled to the load 7 in a circuit that extends from one side of winding $5_c$ through the load and through the parallel arrangement of series connected diode $D_1$ and variable resistor $R_1$ and series connected diode $D_2$ and variable resistor $R_2$. Windings $5_a$ and $5_b$ of transformer 5 are wound and oriented with respect to winding $5_c$ in the manner indicated in the drawing so as to induce potentials of opposite polarity across winding $5_c$ as current from the power supply line 3 alternately energizes windings $5_a$ and $5_b$.

In operation, when transistor $Q_2$ is cut off by the reverse bias periodically applied to its base by the alternating current source $S_2$, the forward bias simultaneously applied to the base of transistor $Q_1$ energizes it and current flows from the power supply line 3 through the transistor and through primary winding $5_a$ of transformer 5 to ground. Flow of current through winding $5_a$ induces a potential across secondary winding $5_c$ and current flows in the secondary circuit from winding $5_c$ successively through diode $D_1$, variable resistor $R_1$ and the load 7 back to winding $5_c$. During the next half cycle of alternating sources $S_1$ and $S_2$ transistor $Q_1$ is cut off by the reverse bias applied to its base by source $S_1$ and current flows through transistor $Q_2$ and winding $5_b$ of transformer 5 due to the forward bias applied to the base of transistor $Q_2$ by source $S_2$. Flow of current through winding $5_b$ then induces a potential across secondary winding $5_c$ and current in the secondary circuit flows successively through the load 7 variable resistor $R_2$ and diode $D_2$.

Figure 2:
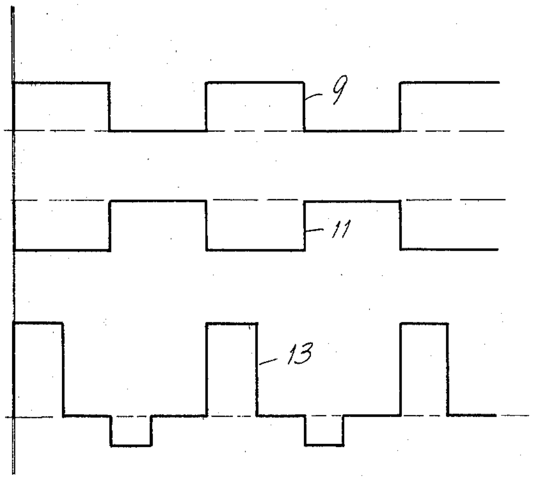
FIG. 2 shows the waveforms of current pulses at selected points in the embodiment of FIG. 1.

Waveforms 9 and 11 of the flow of current through transistors $Q_1$ and $Q_2$ and of the asymmetric pulse 13 applied across the load 7 are shown in FIG. 2 of the drawing. It will be noted that although current flows through transistors $Q_1$ and $Q_2$ during substantially the entire interval or half cycle that they are forwardly biased, current in the secondary circuit of transformer 5 flows only during the first portion of each half cycle. This is caused by saturation of the core of transformer 5. Thus, although current continues flow through the primary winding of transformer 5 throughout ea chentire half cycle, no change of flux is developed between the primary and secondary windings and no secondary output voltage results after the core of the transformer saturates. The difference in amplitude of the positive and negative pulses of the output signal 13 is primarily determined by the turns of windings $5_a$ and $5_b$. Resistors $R_1$ and $R_2$ control the flow of current in the primary and secondary windings of transformer 5 and therefore also control how quickly the core of transformer 5 becomes saturated. Thus, by varying the resistance of resistors $R_1$ and $R_2$, the relative width of the positive and negative output pulses of waveform 13 may be readily controlled.

Figure 3:
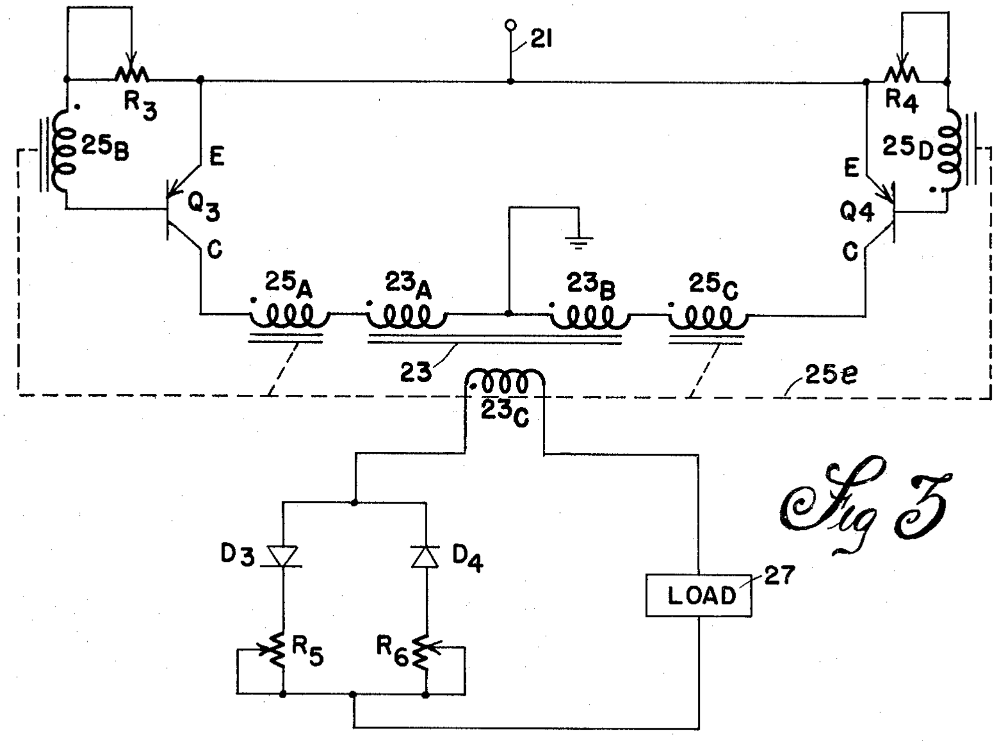
FIG. 3 is a diagrammatic view of another preferred embodiment of the present invention.

Another embodiment of the present invention is illustrated in FIG. 3 of the drawing. As shown therein, the emitter-collector circuit of transistor $Q_3$ extends from the direct current power supply line 21 through the transistor, through the primary winding $23_a$ of transformer 23, and through the primary winding $25_a$ of transformer 25 to ground. The base of transistor $Q_3$ is coupled to its emitter through the secondary winding $25_b$ of transformer 25 and variable resistor $R_3$. The emitter-collector circuit of transistor $Q_4$ extends from the power supply line 21 through transistor $Q_4$, through the primary winding $23_b$ of transformer 23, and through the primary winding $25_c$ of the transformer 25 to ground. The base of transistor $Q_4$ is coupled to its emitter through the secondary winding $25_d$ of transformer 25 and variable resistor $R_4$. The secondary winding $23_c$ of transformer 23 is coupled to the load 27 in a circuit that extends from one side of winding $23_c$ through the load and through the parallel arrangement of the series connected diode $D_3$ and variable resistor $R_5$ and the series connected diode $D_4$ and variable resistor $R_6$. Windings $23_a$ and $23_b$ of transformer 23 are wound and oriented with respect to winding $23_c$ in the manner indicated in the drawing so as to induce potentials of opposite polarity across winding $23_c$ as current from the power supply line 21 alternately eenrgizes windings $23_a$ and $23_b$. Windings $25_a$ and $25_c$ of transformer 25 are wound and oriented with respect to windings $25_b$ and $25_d$ in the manner also indicated in the drawing and provide potentials at the bases of transistors $Q_3$ and $Q_4$ in a manner which will be more apparent hereinafter. The common core of windings $25_a$, $25_b$, $25_c$ and $25_d$ of transformer 25 is designated in the drawing by the dotted line $25_e$.

In operation, when the flow of current through transistor $Q_3$ is increasing, a forward bias is developed across transistor $Q_3$ and a reverse bias is developed across transistor $Q_4$ by way of windings $25_b$ and $25_d$ of transformer 25. When the core of transformer 25 saturates, the forward bias on transistor $Q_3$ cuts off. When transistor $Q_3$ cuts off, the flux of transformer 25 decreases from its saturation value to its remanent value. This applies a forward bias on transistor $Q_4$ and it begins to conduct. Transistor $Q_4$ continues to conduct until transformer 25 saturates in the opposite direction. When this occurs, the forward bias across transistor $Q_4$ dissipates in variable resistor $R_4$, and transistor $Q_4$ cuts off. The flux through transformer 25 then decreases from its saturation value to its remanent value inducing a forward bias across transistor $Q_2$ and the entire cycle is repeated. As transistors $Q_3$ and $Q_4$ alternately conduct current from the power supply line 21 in a free-running oscillatory manner and as transformer 25 operates from knee-to-knee on its flux-current loop, potentials of alternate polarity are induced in the secondary winding $23_c$ of transformer 23 from windings $23_a$ and $23_b$. The core of transformer 23 saturates before the core of transformer 25 so as to produce an output waveform similar to that shown in FIG. 2 for the circuitry of FIG. 1. Current in the secondary circuit of transformer 23 then alternately flows through load 27 in the same manner as was described above in the description of the embodiment of FIG. 1.

Figure 4:
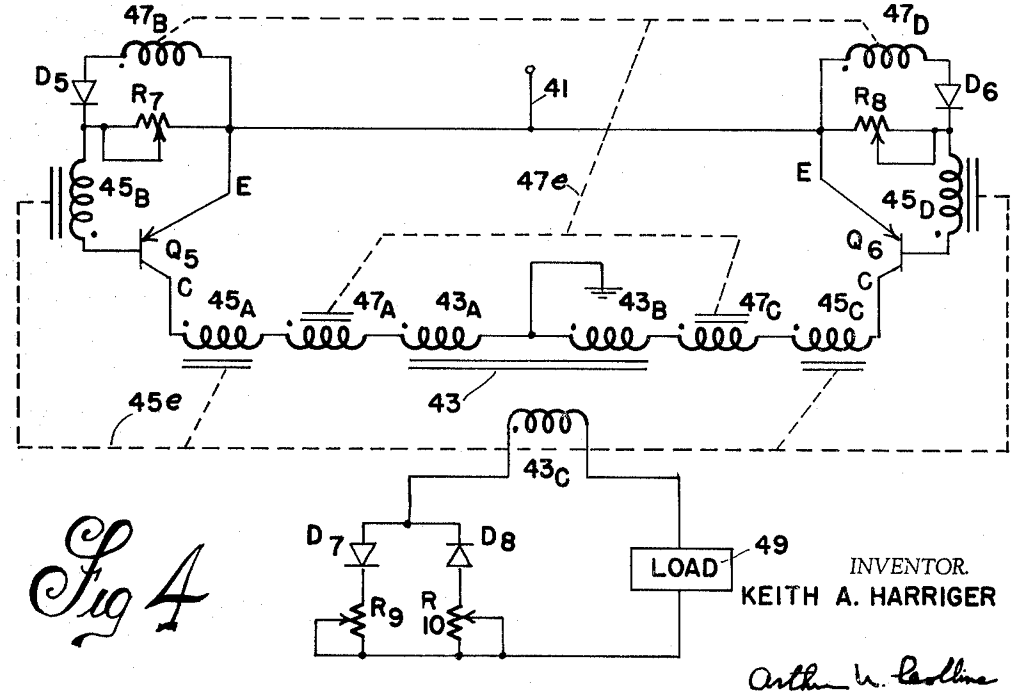
FIG. 4 is a diagrammatic view of still another preferred embodiment of the present invention.

Still another embodiment of the present invention is illustrated in FIG. 4 of the drawing. As shown therein, the emitter-collector circuit of transistor $Q_5$ extends from the direct current power supply line 41 through the transistor, and successively through the primary windings $43_a$, $45_a$ and $47_a$ of transformers 43, 45 and 47 to ground. The base of transistor $Q_5$ is coupled to its emitter through the secondary winding $45_b$ of transformer 45 and variable resistor $R_7$. The series connected secondary winding $47_b$ of transformer 47 and diode $D_5$ are connected as shown in parallel with variable resistor $R_7$. The emitter-collector circuit of transistor $Q_6$ extends from the power supply line 41 through transistor $Q_6$ and successively through the primary windings $43_b$, $45_c$, and $47_b$ of transformers 43, 45 and 47 to ground. The base of transistor $Q_6$ is coupled to its emitter through the secondary winding $45_d$ of transformer 45 and variable resistor $R_8$. The series connected secondary winding $47_d$ of transformer 47 and diode $D_6$ are connected as shown in parallel with variable resistor $R_8$. The secondary winding $43_c$ of transformer 43 is coupled to the load 49 in a circuit that extends from one side of winding $43_c$ through the load and through the parallel arrangement of the series connected diode $D_7$ and variable resistor $R_9$ and the series connected diode $D_8$ and variable resistor $R_{10}$. Windings $43_a$ and $43_b$ of transformer 43 are wound and oriented with respect to winding $43_c$ in the manner indicated in the drawing so as to induce potentials of opposite polarity across winding $43_c$ as current from the power supply line 41 alternately energizes windings $43_a$ and $43_b$. Windings $45_b$ and $45_d$ and windings $47_b$ and $47_d$ of transformers 45 and 47 are wound and oriented with respect to their respective primary windings $45_a$ and $45_c$ and windings $47_a$ and $47_c$ in the manner also indicated in the drawing and affect potentials at the bases of transistors $Q_5$ and $Q_6$ in a manner which will be more apparent hereinafter. The common cores of windings $47_a$, $47_b$, $47_c$, and $47_d$ of transformer 43 and of windings $45_a$, $45_d$, $45_c$ and $45_d$ of transformer 45 are respectively designated in the drawing by the dotted lines $47_e$ and $45_e$.

In operation, the embodiment of the invention shown in FIG. 4 of the drawing operates generally similar to that of the above described embodiment of FIG. 3. The circuits which include diodes $D_5$ and $D_6$ and windings $47_b$ and $47_d$ of transformer 47, however, provide particularly rapid switching of transistors $Q_5$ and $Q_6$ where high repetition rates of the alternating current output pulse is desired. Thus when transistor $Q_5$ conducts, an output pulse is developed in transformer 43, a sustaining negative bias for maintaining transistor Q–5 conductive is developed in transformer 47, and a relatively small postive counterbias is developed in transformer 47. Although the positive potential developed across resistor R–7 by winding $47_b$ tends to cut transistor Q–5 off, it is ineffective as long as the larger negative biasing potential is maintained by winding $45_b$. The core of transformer 43 saturates first. This terminates the positive portion of pulse 13 and produces the interval between pulses shown in FIG. 2. After a predetermined interval, the core of transformer 45 also saturates. The negative bias developed in winding $45_b$ therefore dissipates. The positive bias developed in winding $47_b$ then takes over and quickly cuts transistor Q–5 off. A similar cycle of events occurs when transistor Q–6 is energized and is subsequently cut-off.

Obviously many modifications and variations of the present invention are possible in the light of the above teachings. It is therefore to be understood that within the scope of the appended claims the invention may be practiced otherwise than as specifically described.

What is claimed is:

1. An asymmetric wave generator comprising:
(a) a source of direct current power;
(b) a saturable transformer having a pair of primary windings and a secondary winding;
(c) a pair of transistors;
(d) means coupling the source to one primary winding through the emitter-collector circuit of one of the transistors;
(e) means coupling the source to the other primary winding through the emitter-collector circuit of the other transistor;
(f) a pair of oppositely phased alternating current sources;
(g) means coupling one alternating current source between the base and emitter of one transistor;
(h) means coupling the other alternating current source between the base and emitter of the other transistor;
(i) a load;
(j) a first variable resistor;
(k) a first diode;
(l) means connecting the secondary winding, the load, the first variable resistor, and the first diode in series, the first diode being oriented so as to permit flow current through the secondary winding in one direction;
(m) a second variable resistor;
(n) a second diode;
(o) and means connecting the secondary winding, the load, the second variable resistor, and the second diode in series, the second diode being oriented so as to permit flow of current through the secondary winding in the opposite direction.

2. An asymmetric wave generator comprising:
(a) a source of direct current power;
(b) a first saturable transformer having a pair of primary windings and a secondary winding;
(c) a second saturable transformer having a pair of primary windings and a pair of oppositely wound secondary windings;
(d) a pair of transistors;
(e) a circuit connecting the source, the emitter-collector circuit of one transistor, one of the primary windings of the first transformer and one of the primary windings of the second transformer in series;
(f) a circuit connecting the source, the emitter-collector circuit of the other transistor, the other primary winding of the first transformer and the other primary winding of the second transformer in series;
(g) a pair of variable resistors;
(h) means coupling one of the secondary windings of the second transformer in series with one variable resistor between the emitter and base of one transistor;
(i) means coupling the other secondary winding of the second transformer in series with the other variable resistor between the emitter and base of the other transistor;
(j) a load;
(k) a third variable resistor;
(l) a first diode;
(m) means connecting the secondary winding of the first transformer, the load, the third variable resistor, and the first diode in series, the first diode being oriented so to permit flow of current through the secondary winding of the first transformer in one direction;
(n) a fourth variable resistor;
(o) a second diode;
(p) and means connecting the secondary winding of the first transformer, theh load, the fourth variable resistor, and the second diode in series, the second diode being oriented so as to permit flow of current through the secondary winding of the first transformer in opposite the direction.

3. An asymmetric wave generator comprising:
(a) a source of direct current power;
(b) a first saturable transformer having a pair of primary windings and a secondary winding;
(c) a second saturable transformer having a pair of primary windings and a pair of oppositely wound secondary windings;
(d) a third saturable transformer having a pair of primary windings and a pair of secondary windings;
(e) a pair of transistors;
(f) a circuit connecting the source, the emitter-collector circuit of one transistor, one of the primary windings of the first transformer, one of the primary windings of the second transformer and one of the primary windings of the third transformer in series;
(g) a circuit connecting the source, the emitter-collector circuit of the other transistor, the other primary winding of the first transformer, the other primary winding of the second transformer and the other primary winding of the third transformer in series;
(h) a pair of variable resistors;
(i) means coupling one of the secondary windings of the second transformer in series with one variable resistor between the emitter and base of one transistor;
(j) means coupling the other secondary winding of the second transformer in series with the other variable resistor between the emitter and base of the other transistor;
(k) means coupling one secondary winding of the third transformer in parallel with the one variable resistor;
(l) means coupling the other secondary winding of the third transformer in parallel with the other variable resistor, the secondary windings of the third transformer being oriented so as to develop potentials in opposition to the potentials developed by their associated secondary windings of the second transformer;
(m) a load;
(n) a third variable resistor;
(o) a first diode;
(p) means connecting the secondary winding of the first transformer, the load, the third variable resistor, and the first diode in series, the first diode being oriented so as to permit flow of current through the secondary winding of theh first transformer in one direction;
(q) a fourth variable resistor;
(r) a second diode;
(s) and means connecting the secondary winding of the first transformer, the load, the fourth variable resistor, and the second diode in series, the second diode being oriented so as to permit flow of current through the secondary winding of the first transformer in the opposite direction.

References Cited by the Examiner

UNITED STATES PATENTS

| | | | |
|---|---|---|---|
| 3,015,772 | 1/1962 | Rochelle | 331—113 |
| 3,051,914 | 8/1962 | Brown | 331—113 |

ROY LAKE, *Primary Examiner.*

JOHN KOMINSKI, *Examiner.*